US006994136B2

United States Patent
Stanczak

(10) Patent No.: US 6,994,136 B2
(45) Date of Patent: Feb. 7, 2006

(54) WHEEL END TIRE AIR PUMP

(75) Inventor: Edmund A. Stanczak, St. Clair Shores, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/428,959

(22) Filed: May 2, 2003

(65) Prior Publication Data

US 2004/0216827 A1 Nov. 4, 2004

(51) Int. Cl.
B60C 23/10 (2006.01)

(52) U.S. Cl. ........................................ 152/418; 152/421
(58) Field of Classification Search ................. 152/415, 152/417–419, 421–422; 417/233
See application file for complete search history.

(56) References Cited

U.S. PATENT DOCUMENTS

| 1,002,035 | A | * | 8/1911 | Clement ...................... 417/233 |
| 1,115,435 | A | * | 10/1914 | Jobes .......................... 152/419 |
| 1,358,524 | A | * | 11/1920 | Cooper ........................ 152/421 |
| 1,448,248 | A | * | 3/1923 | Anthony ...................... 152/421 |
| 1,517,782 | A | * | 12/1924 | Harper ......................... 92/5 R |
| 1,627,654 | A | | 5/1927 | Lewis |
| 1,885,284 | A | | 11/1932 | Otto |
| 2,506,677 | A | * | 5/1950 | McKenna .................... 152/422 |
| 3,452,801 | A | * | 7/1969 | Fletcher et al. ............. 152/418 |
| 4,061,200 | A | * | 12/1977 | Thompson ................... 180/165 |
| 4,269,252 | A | | 5/1981 | Shapiro |
| 4,651,792 | A | | 3/1987 | Taylor |
| 4,840,212 | A | | 6/1989 | Wei |
| 5,409,049 | A | | 4/1995 | Renier |
| 5,452,753 | A | | 9/1995 | Olney |
| 5,556,489 | A | | 9/1996 | Curlett |
| 5,591,281 | A | * | 1/1997 | Loewe ........................ 152/418 |
| 5,667,606 | A | | 9/1997 | Renier |
| 5,947,696 | A | | 9/1999 | Baumgarten |
| 6,731,205 | B2 | * | 5/2004 | Schofield et al. ........... 340/444 |

FOREIGN PATENT DOCUMENTS

| EP | 0621144 | 6/1997 |
| WO | WO 97/02961 | 1/1997 |
| WO | WO 98/28159 | 7/1998 |

* cited by examiner

Primary Examiner—Russell D. Stormer
Assistant Examiner—Jason R Bellinger
(74) Attorney, Agent, or Firm—Carlson, Gaskey & Olds

(57) ABSTRACT

A wheel end assembly includes a self-contained air pump mechanism that maintains tire pressure at a desired level. The pump mechanism includes a piston and cylinder assembly that rotate with the tire. A linkage assembly drives the piston within the cylinder as the wheel end assembly rotates to pump air into the tire via a valve. The linkage assembly includes a first link fixed to a non-rotating wheel end component and a second link that rotates relative to the first link and which is coupled to drive the piston within the cylinder. The tire valve is in fluid communication with the cylinder and automatically opens when air pressure in the tire falls below a predetermined level and automatically closes when the air pressure achieves the predetermined level. An atmospheric valve is in fluid communication with the cylinder, and automatically opens to recharge the cylinder once the initial pressure charge has been delivered to the tire.

26 Claims, 5 Drawing Sheets

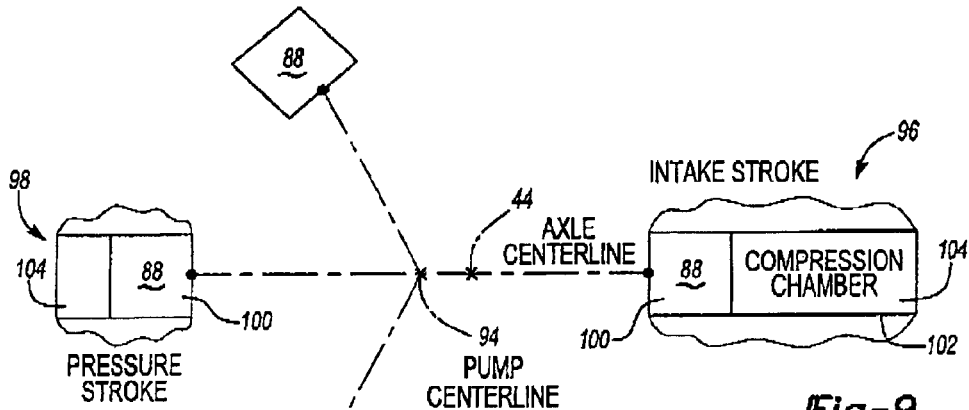
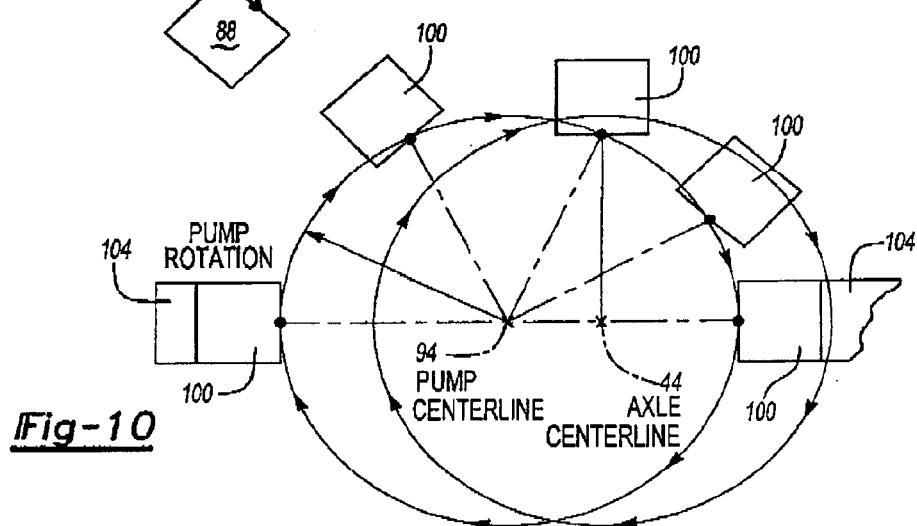
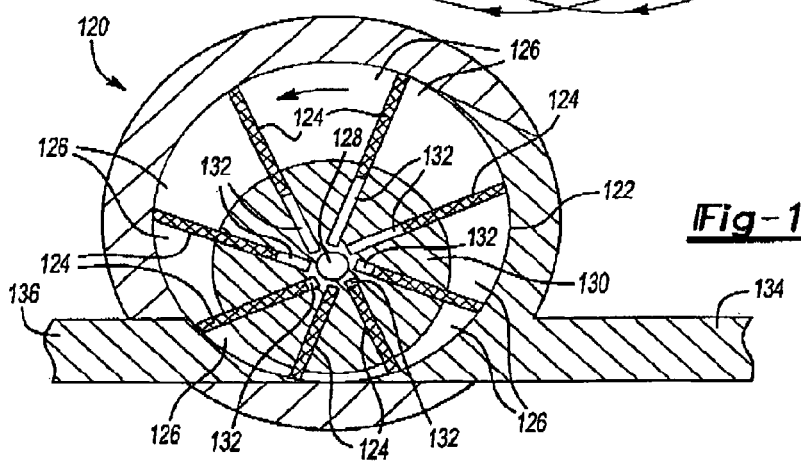

WHEEL END TIRE AIR PUMP

BACKGROUND OF THE INVENTION

This invention relates to a vehicle wheel end assembly that includes a tire air pump to maintain tire pressure at a desired level.

Over the road vehicles, such as freight hauling tractor-trailers, can experience low tire inflation pressure, which results in excessive tread wear and/or premature failure of the tire itself. Due to the nature of freight hauling vehicle applications, it is difficult to monitor the tire pressure in each of the vehicle wheels, especially the trailer wheels.

One solution to this problem has been to incorporate a central tire inflation system (CTIS) on the vehicle. Typically, CTIS operates off a brake system air tank and is coupled to each of the tires on the tractor and/or trailer. Thus, pressurized air must be transferred from the air tank to the rotating wheel hub. Special seals and connections are required to transfer this pressurized air from a non-rotating component to a rotating tire. Further, the pressurized air must be routed from a central location to each of the wheels. This increases system costs and is labor intensive.

Thus, it is desirable to have a tire inflation mechanism that is self-contained at each wheel end to improve tire pressure maintenance at trailer axle wheel ends. Further, there is a need for a more cost effective and easily installed system.

SUMMARY OF THE INVENTION

A wheel end assembly includes a self-contained tire air pump for automatically maintaining tire pressure at a desired level. Preferably each wheel end assembly on an axle includes a separate pump to provide independent operation at each wheel end assembly. The pump is driven by rotation of the wheel end assembly, thus, the motive force for the pump is a vehicle power plant component, such as a vehicle engine.

In one disclosed embodiment, the vehicle wheel end assembly includes a non-rotating first axle component that defines a central axis. A second axle component is rotatably supported by the first axle component for rotation about the central axis. A tire is mounted for rotation with the second axle component about the central axis. A pump mechanism includes a first pump member fixed to the first axle component and a second pump member mounted for rotation with the second axle component. The first pump member drives the second pump member to inflate the tire via a valve when pressure within the tire falls below a predetermined level.

In one disclosed embodiment, the second pump member is a cylinder that is received within a pressure chamber that is in fluid communication with the tire via the valve. The first pump member includes a pump drive shaft that is fixed to the non-rotating axle component. A rotating shaft has a first end coupled to the pump drive shaft and a second end operably coupled to drive the piston within the pressure chamber.

A first one-way check valve is in fluid communication with the tire and the pressure chamber, which holds an initial pressure charge. When air pressure within the tire falls below the predetermined level, the first one-way check valve automatically opens and the initial pressure charge is delivered to the tire. A second one-way check valve is in fluid communication with the pressure chamber and the atmosphere. Once the initial pressure charge has been delivered to the tire via the first one-way check valve, the second one-way check valve automatically opens to recharge the pressure chamber.

The subject invention provides self-contained wheel end pumps that automatically operate to maintain tire pressures at a desired levels, which is especially useful in trailer axle assemblies where it is difficult to accurately and continuously monitor tire pressure. These and other features of the present invention can be best understood from the following specifications and drawings, the following of which is a brief description.

BRIEF DESCRIPTION OF THE DRAWINGS

FIG. 9 is a schematic view of the pump mechanism of FIG. 7 indicating intake and pressure stroke positions.

FIG. 10 is a schematic view of rotational centerline of the pump mechanism relative to an axle centerline.

FIG. 11 is a schematic view of an alternate pump mechanism.

DETAILED DESCRIPTION OF A PREFERRED EMBODIMENT

Figure 1:
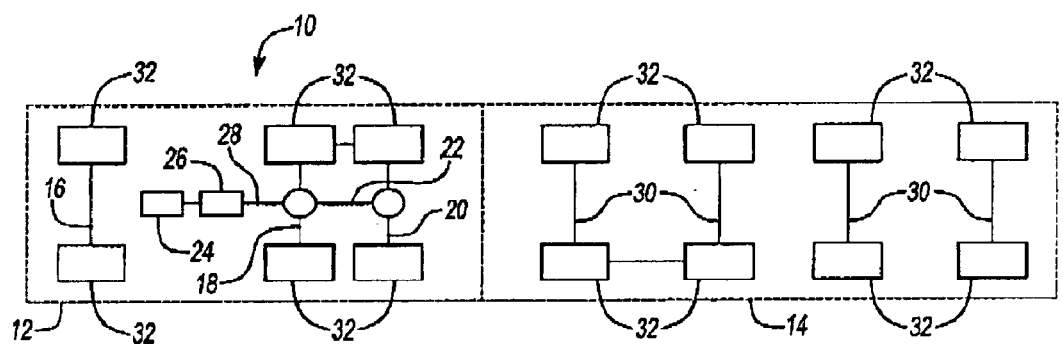
FIG. 1 shows a schematic view of a tractor trailer vehicle.

An over the road vehicle is shown schematically at 10 in FIG. 1. The vehicle 10 includes a tractor 12 that is coupled to a trailer 14. The tractor 12 typically includes a front non-drive axle 16 and a tandem axle with a forward drive axle 18 and a rear drive axle 20 connected by a driveshaft 22. An engine 24 and transmission 26 drive a main driveshaft 28, which is coupled to the forward drive axle 18. The trailer 14 includes a plurality of trailer axles 30 that are typically non-driving axles.

Figure 2:
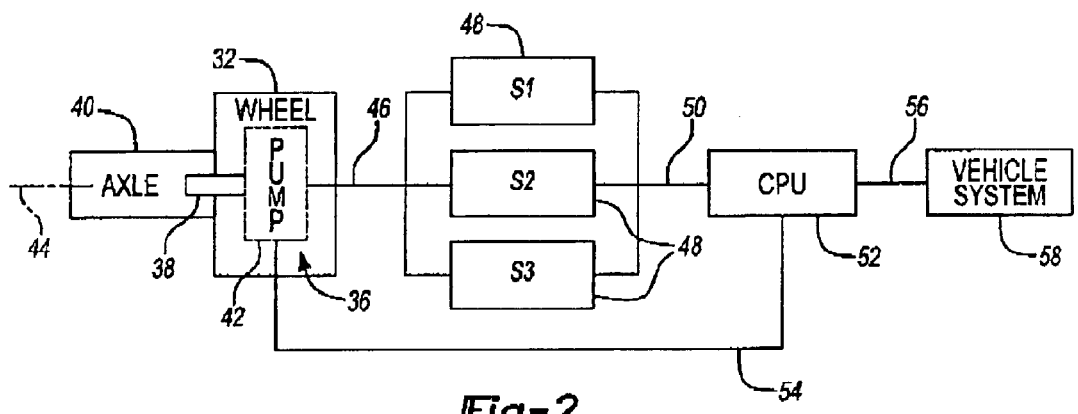
FIG. 2 shows a schematic view of a wheel end assembly incorporating the subject invention.

Each of the axles 16, 18, 20, 30 includes a pair of wheel ends 32 that rotatably support tires 34. Each wheel end 32 can support one or more tires 34 depending on the application. As schematically shown in FIG. 2, each wheel end 32 includes a self-contained pump mechanism 36 that is used to maintain a desired tire pressure at each respective wheel end 32. It should be understood that the pump mechanism 36 could be any of various types of pumps known in the art and could be used at all tractor and trailer wheel ends 32 on the vehicle 10 or just on selected wheel ends 32. Further, it should be understood that the self-contained pump mechanism 36 is especially useful for trailer axles 30 where it is difficult to accurately and continuously monitor tire pressure.

The pump mechanism 36 includes a first member 38 that is fixed to a non-rotating axle component 40 and a second member 42 that rotates with the wheel end 32. The first member 38 drives the second member 42 as the wheel end rotates about a central axis 44. In one disclosed embodiment, the relative rotation between the first member and the wheel end 32 generates a voltage 46 that can be used to power sensors 48 for measuring various vehicle or wheel end characteristics. For example, the sensors 48 could be used to measure wheel speed, tire pressure, tire temperature, etc. The sensors 48 generate signals 50 that are transmitted to a central processing unit (CPU) 52, which can then issue a control command 54 to the pump mechanism 36 or a control command 56 to another vehicle system 58, such as a system for controlling braking or vehicle roll-over, for example. It should be understood that the subject invention does not require voltage generation in order to operate, the possibility of voltage generation is just one of the benefits created by the subject invention. The pump mechanism 36 is preferably powered solely by the rotation of the wheel end 32 during vehicle operation.

Figure 3:
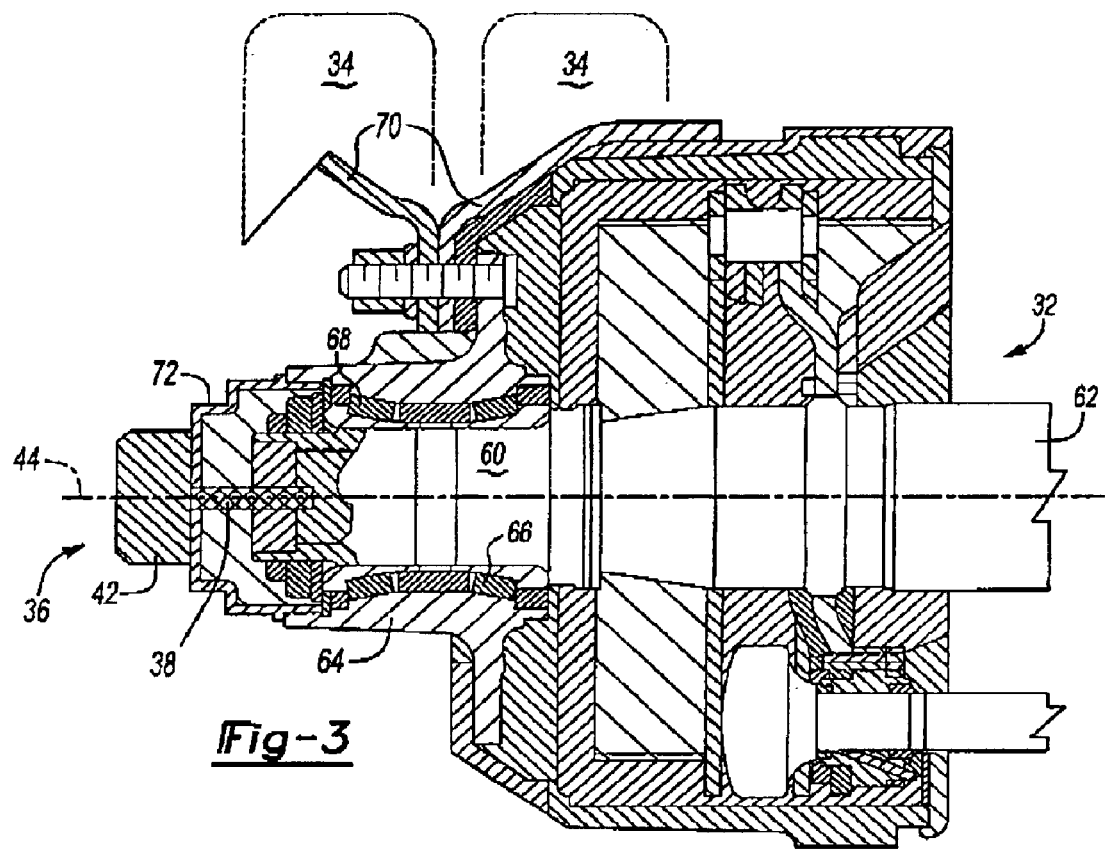
FIG. 3 is a cross-sectional view of a wheel end assembly incorporating the subject invention.

As shown in FIG. 3, a wheel end 32 includes a spindle 60 that is fixed to a non-rotating axle component, such as a beam member 62. A wheel hub 64 is rotatably supported on the spindle 60 by a bearing set that preferably includes an inner bearing 66 and an outer bearing 68. Tires 34 are mounted for rotation with the wheel hub 64 and are supported on rims 70. The tires 34, rims 70, and wheel hub 64 all rotate about the central axis 44 defined by the wheel end 32.

The first member 38 of the pump mechanism 36 is fixed to the spindle 60 and the second member 42 is mounted for rotation with the wheel hub 64. The wheel hub 64 includes a hub cap 72 that encloses the wheel end 32 to protect internal components from external contaminants such as dirt, rocks, etc. The second member 42 can be mounted for rotation with the wheel hub or the hub cap 72 and could be externally or internally mounted within the wheel end 32.

Figure 4A:
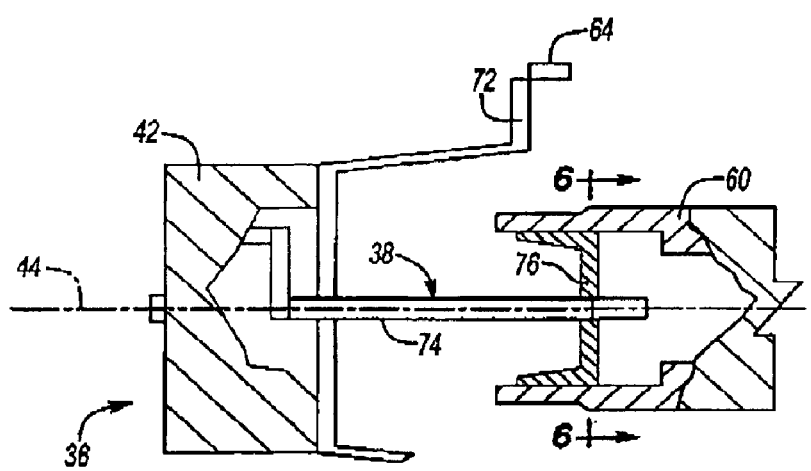
FIG. 4A is a schematic view of one embodiment of a pump mechanism incorporated into a wheel end assembly.
Figure 4B:
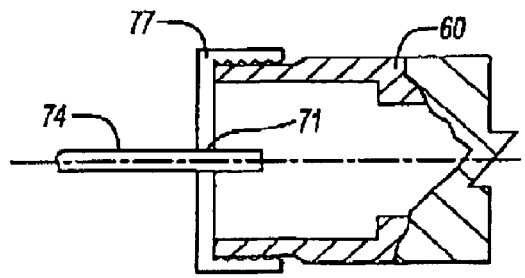
FIG. 4B is a schematic view of the pump mechanism of FIG. 4A with an alternative mounting configuration.

In one embodiment, shown in FIG. 4A, the first member 38 comprises a stationary or non-rotating link or pump drive shaft 74 that is fixed to the spindle 60. The pump drive shaft 74 can be directly attached to the spindle 60 or press-fit into a spindle plug 76. Preferably the plug 76 is press-fit into an end of the spindle 60 and is retained in place by the interference fit with adhesive if needed. Optionally, a threaded connection or other similar attachment could be used to retain the plug 76 to the spindle 60. Also, the pump drive shaft 74 could be mounted to the spindle in other ways, such as an outer nut 77 having a square hole 71 that receives the shaft 74, see FIG. 4B.

Figure 5:
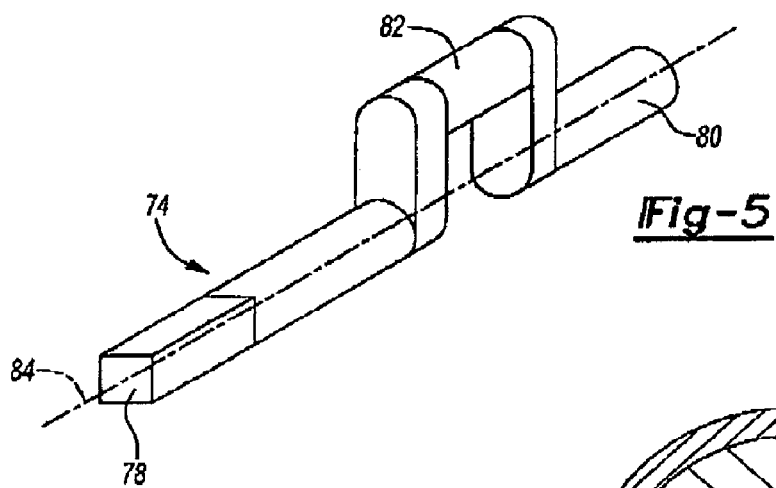
FIG. 5 is a perspective view of a pump drive shaft shown schematically in FIG. 4.
Figure 6:
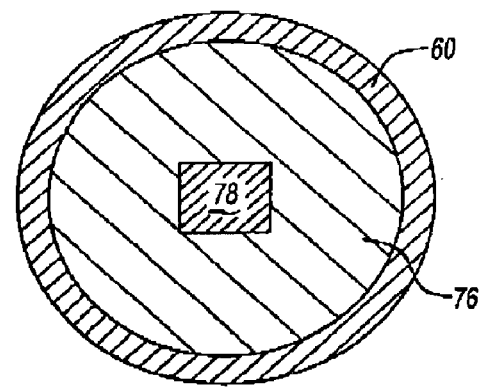
FIG. 6 is a cross-sectional view taken along lines 6—6 of FIG. 4A.

In one embodiment, the pump drive shaft 74 includes a square end 78 that mates with the plug 76 or nut 77, see FIGS. 5 and 6. An opposite end 80 of the pump drive shaft 74 is operably coupled to drive the second member 42 of the pump mechanism 36. This will be discussed in greater detail below. A central body portion 82 of the pump drive shaft 74 includes a C-shaped body that extends transversely to a central body axis 84 defined by the ends 78, 80.

Figure 7:
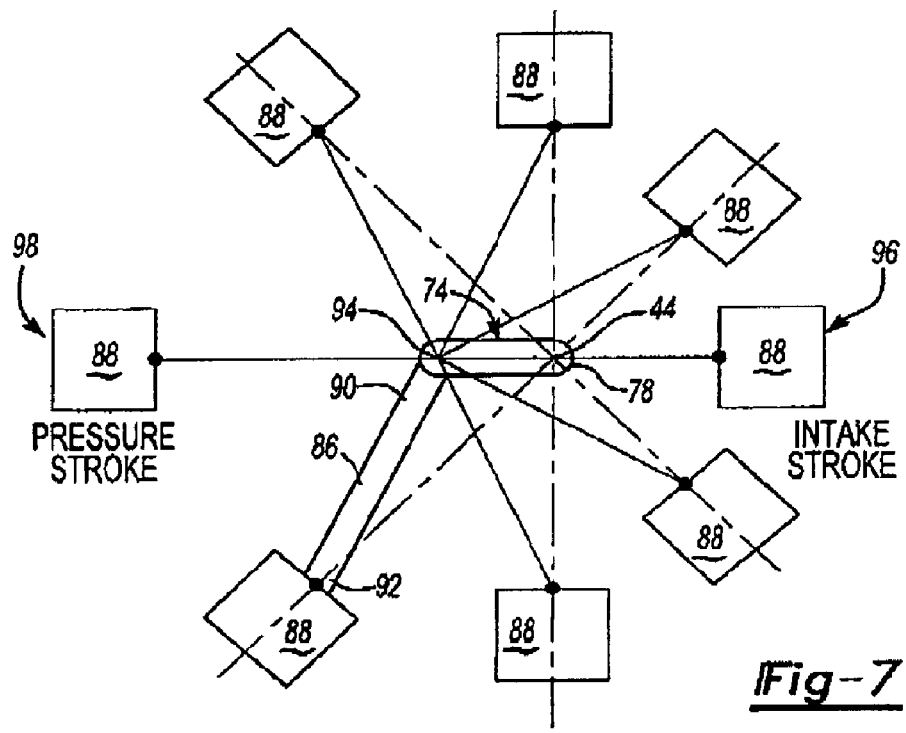
FIG. 7 is a schematic view of the pump mechanism shown at a plurality of operational positions as the wheel end assembly rotates.

As shown in FIG. 7, a rotating shaft or link member 86 interconnects the pump drive shaft 74 to the second member 42. The second member 42 is preferably a piston and cylinder assembly 88 that rotates with the wheel hub 64 and hub cap 72. A first end 90 of the rotating shaft or link member 86 is connected to the pump drive shaft 74 and a second end 92 of the rotating link member 86 is operably coupled to the piston and cylinder assembly 88.

The square end 78 of the pump drive shaft 74 is centered on the central axis 44 and the connection between the rotating link member 86 and the pump drive shaft 74 defines a centerline 94 of the pump mechanism 36. The central axis 44 and the centerline 94 are spaced apart and parallel to each other, i.e., the centerline 94 is non-concentric with the central axis 44 of the wheel end 32.

As discussed above, the piston and cylinder assembly 88 rotates with the wheel hub 64. FIG. 7 shows the piston and cylinder assembly 88 at eight (8) different rotational positions. An intake stroke position is shown at 96 and a pressure stroke position is shown at 98.

Figure 8:
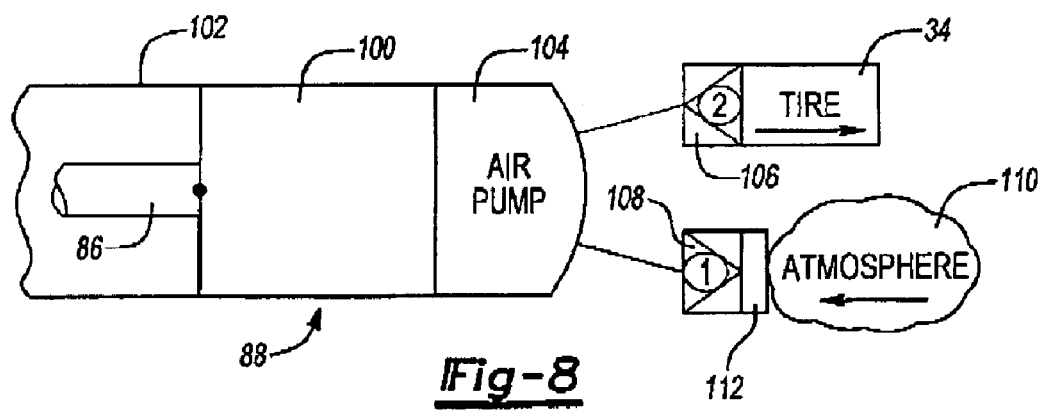
FIG. 8 is a schematic view of a valve assembly and pump mechanism that is driven by the pump drive shaft.

FIG. 8 shows the piston and cylinder assembly 88 in greater detail. The piston and cylinder assembly 88 includes a piston 100 that is slidably mounted within a cylinder 102 that defines a pressure chamber 104. The rotating link member 86, driven by the pump drive shaft 74, moves the piston 100 back and forth within in the cylinder 102 in a direction transverse to the central axis 44 as the wheel hub 64 rotates about the spindle 60.

The pressure chamber 104 holds an air pressure charge that is delivered to the tire 34 under predetermined conditions. A first one-way check valve 106 is in fluid communication with the tire 34 and the pressure chamber 104. A second one-way check valve 108 is in fluid communication with the pressure chamber 104 and atmosphere 110. Upstream from second one-way check valve 108 is an air filter 112 that prevents atmospheric contaminants from entering the pump and tires.

The pressure in the pressure chamber 104 remains at a generally constant pressure if the tire pressure is equal to or greater than a predetermined level and the first one-way check valve 106 remains closed. Once the tire pressure falls below the predetermined level, the pump 36 automatically forces the first one-way check valve 106 open and delivers the pressure charge in the pressure chamber 104 to the tire 34. The first one-way check valve closes once the desired pressure level is achieved.

The second one-way check valve 108 stays closed as long as the pressure chamber 104 is charged. Once the initial pressure charge is delivered to the tire 34, the pressure chamber 104 is depleted of air and the pump 36 automatically opens the second one-way check valve 108 to draw air in from the atmosphere 110.

FIG. 9 shows the operation of the piston and cylinder assembly 88 in greater detail. FIG. 9 shows the piston and cylinder assembly 88 at four (4) different locations as the piston and cylinder assembly 88 rotates with the wheel hub 64. The intake stroke, shown at 96 shows that the piston and cylinder assembly 88 has been drawn toward the pump centerline 94 and the size of the pressure chamber 104 has increased to take in air. The discharge or pressure stroke, shown at 98, shows that the piston and cylinder assembly 88 has been pushed away from the pump centerline 94 to open the first one-way check valve 106 and discharge air into the tire. Thus, the pressure chamber 104 varies in size because the piston and cylinder assembly 88 moves relative to the pump centerline 94 while the piston 100 stays at approximately the same distance from the pump centerline 94.

The pump centerline 94 and central axis 44 are shown in FIG. 10, which shows the piston 100 in five (5) different rotational positions. The pump mechanism 36 freewheels when the tire pressure is at a desired pressure level, which will be the case for the vast majority of time on the road. Both one-way check valves 106, 108 remain closed in this condition and the pressure chamber 104 acts as a pneumatic spring.

While a piston and cylinder assembly 88 is preferred, the second pump member 42 could be a rotary compressor pump 120 as shown in FIG. 11. The rotary compressor pump 120 includes rotating casing member 122, which is mounted to rotate with the wheel hub 64 and hub cap 72, and a plurality of spring-loaded plates 124 that are spaced apart from one another to define a plurality of compartments 126. A pump drive shaft 128, similar to that described above, is fixed or keyed to the spindle 60 along with a stationary disc 130.

One end of each of the spring-loaded plates 124 is fixed for rotation with the rotating casing member 122. As the wheel rotates, each of the plates 124 moves linearly within a slot 132 to vary the size of the compartments 126. In other words, as the wheel rotates, the plates 124 move radially in and out relative to the centrally located pump drive shaft 128 to compress air by decreasing the size of the compartments 126.

As shown in FIG. 11, air at atmospheric pressure is drawn in at 134 to fill compartments 126 with non-pressurized air. As the plates 124 rotate in a counter-clockwise direction, the plates 124 are moved radially inward toward the drive shaft 128 to progressively decrease the size of the compartments 126 and compress to air to a desired pressure level at 136. As the wheel continues to rotate, the plates slide radially away from the drive shaft 128 to increase chamber size and to receive the non-pressurized air and start the pump cycle over again. The rotary compressor pump 120 utilizes check valves 106, 108 in the same manner as described above with regard to the piston and cylinder assembly 88.

The subject invention provides a self-contained air pump unit that is installable at each wheel end assembly 32 on a vehicle. The unit operates independently from other pump units and does not require any power other than that provided via the engine power that drives the wheel end assemblies 32. The units automatically keep tire pressure at a desired level, which improves tread wear and helps prevent premature tire failure. The pump units are especially useful in trailer axles where it is difficult to monitor tire pressure.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle wheel end assembly comprising:
    a non-rotating axle component defining a lateral axis;
    a rotating axle component supported by at least one bearing for rotation relative to said non-rotating axle component about said lateral axis;
    a pump mechanism including a first pump member fixed to said non-rotating axle component and a second pump member mounted for rotation with said rotating axle component wherein said pump mechanism defines a central pump axis that is spaced apart from and parallel to said lateral axis; and
    at least one valve adapted to be in fluid communication with a tire wherein said first pump member drives said second pump member to inflate the tire through said at least one valve when pressure within the tire falls below a predetermined level and wherein a distance between said central pump axis and said lateral axis remains generally constant as said first pump member drives said second pump member.

2. The vehicle wheel end assembly as set forth in claim 1 wherein said pump mechanism is self-contained within said rotating and non-rotating axle components to operate solely at the tire.

3. The vehicle wheel end assembly as set forth in claim 1 wherein said non-rotating axle component comprises a trailer axle with a spindle and said rotating axle component comprises a wheel hub supported by said bearing on said spindle.

4. The vehicle wheel end assembly as set forth in claim 1 wherein said first pump member includes a pump drive shaft keyed to said non-rotating axle component and said second pump member includes a piston and a cylinder.

5. The vehicle wheel end assembly as set forth in claim 4 including a rotating shaft coupled at one end to said pump drive shaft and coupled at an opposite end to drive said piston.

6. The vehicle wheel end assembly as set forth in claim 5 wherein said central pump axis is defined at a connection between said pump drive shaft and said rotating shaft.

7. The vehicle wheel end assembly as set forth in claim 5 wherein said piston remains at a constant predetermined distance from said central pump axis as said rotating axle component rotates.

8. The vehicle wheel end assembly as set forth in claim 1 wherein said at least one valve comprises a first one-way check valve in fluid communication with the tire and a second one-way check valve in fluid communication with atmosphere.

9. The vehicle wheel end assembly as set forth in claim 8 wherein said pump mechanism automatically opens said first one-way check valve when the pressure within the tire falls below said predetermined level and said first one-way check valve automatically closes when the pressure within the tire achieves said predetermined level.

10. The vehicle wheel end assembly as set forth in 8 wherein said second pump member includes a pressure charge held within a chamber, said pressure charge being automatically delivered to the tire through said first one-way check valve when the pressure within the tire falls below said predetermined level and wherein said second one-way check valve automatically draws air into said chamber from the atmosphere once said pressure charge has been delivered into the tire.

11. The vehicle wheel end assembly as set forth in claim 8 wherein said pump mechanism freewheels when tire pressure is greater than or equal to said predetermined level with said first and second one-way check valves held closed.

12. The vehicle wheel end assembly as set forth in claim 1 including at least one sensor for monitoring a vehicle characteristic wherein rotation of said rotating axle component relative to said first pump member generates a voltage to power said at least one sensor.

13. The vehicle wheel end assembly as set forth in claim 12 wherein said vehicle characteristic is tire pressure.

14. The vehicle wheel end assembly as set forth in claim 1 wherein said first pump member includes a pump drive shaft fixed to said non-rotating axle component and said second pump member comprises a rotary compressor pump.

15. The vehicle wheel end assembly as set forth in claim 1 wherein said first pump member includes a pump drive shaft keyed to said non-rotating axle component and said second pump member includes a rotating casing operably coupled to a plurality of movable plates spaced apart from one another to define a plurality of compartments.

16. The vehicle wheel end assembly as set forth in claim 15 wherein each of said plurality of movable plates moves in a generally linear path and in a radial direction relative to said pump drive shaft to progressively increase compartment size dining a first portion of one revolution of said rotating casing to draw in air at atmospheric pressure and to progressively decrease a size of said compartments during a second portion of one revolution of said rotating casing to compress the air for delivery to the tire.

17. A trailer axle wheel end assembly comprising:

a spindle mounted to an axle beam defining a central axis;

a wheel hub rotatably supported on said spindle for rotation about said central axis; and an air pump defining a central pump axis that is spaced apart from and parallel to said central axis, said air pump including a first link fixed to said spindle, a piston and cylinder assembly mounted for rotation with said wheel hub, and a second link interconnecting said first link to said piston and cylinder assembly such that as said wheel hub rotates said first link drives said second link which drives said piston and cylinder assembly to automatically pump air into a tire when air pressure within the tire falls below a predetermined level wherein a distance between said central pump axis and said central axis remains generally constant as said first link drives said second link.

18. The trailer axle wheel end assembly as set forth in claim 17 including at least one valve in fluid communication with the tire and wherein said piston and cylinder assembly includes a pressure chamber in fluid communication with said valve, said pressure chamber for holding a pressure charge.

19. The trailer axle wheel end assembly as set forth in claim 18 wherein said at least one valve includes a first one-way check valve that automatically opens when air pressure in the tire falls below said predetermined level to allow said pressure charge to be transferred into the tire.

20. The trailer axle wheel end assembly as set forth in claim 19 wherein said at least one valve includes a second one-way check valve in fluid communication with said pressure chamber and atmosphere, said second one-way check valve automatically opening to draw air into said pressure chamber from the atmosphere when said pressure charge is delivered to the tire via said first one-way check valve.

21. The trailer axle wheel end assembly as set forth in claim 20 wherein said first link is directly attached to said spindle.

22. The trailer axle wheel end assembly as set forth in claim 21 wherein said second link rotates relative to said first link with a connection between said first and second links defining said central pump axis.

23. The trailer axle wheel end assembly as set forth in claim 22 wherein said second link drives said piston and cylinder assembly in a direction transverse to said central axis.

24. The trailer axle wheel end assembly as set forth in claim 23 wherein said piston and cylinder assembly includes a cylinder that forms said pressure chamber and a piston with said cylinder moving relative to said pump centerline and said piston remaining at an approximately equal radial distance from said central pump axis as said wheel hub rotates.

25. The vehicle wheel end assembly as set forth in claim 1 wherein said first pump member comprises a drive shaft having a first shaft end fixed to said non-rotating axle component, said first shaft end being centered on said lateral axis, and wherein said drive shaft includes a C-shaped body portion that is offset from said lateral axis.

26. The trailer axle wheel end assembly as set forth in claim 17 wherein said first link comprises a drive shaft having one shaft end centered on said central axis and including a C-shaped body portion that is offset from said central axis.

* * * * *

UNITED STATES PATENT AND TRADEMARK OFFICE
CERTIFICATE OF CORRECTION

| | | |
|---|---|---|
| PATENT NO. | : 6,994,136 B2 | Page 1 of 1 |
| APPLICATION NO. | : 10/428959 | |
| DATED | : February 7, 2006 | |
| INVENTOR(S) | : Stanczak, Edmund A. | |

It is certified that error appears in the above-identified patent and that said Letters Patent is hereby corrected as shown below:

Column 6

Line 66: Please delete "dining" and replace with --during--.

Signed and Sealed this

Eleventh Day of July, 2006

JON W. DUDAS
*Director of the United States Patent and Trademark Office*